US012490717B2

(12) United States Patent
Mundell et al.

(10) Patent No.: US 12,490,717 B2
(45) Date of Patent: Dec. 9, 2025

(54) SYSTEM AND METHOD FOR DETECTING AND REDUCING ANIMAL VOCALIZATIONS

(71) Applicant: Companion Labs, Inc., San Francisco, CA (US)

(72) Inventors: Paul Mundell, San Francisco, CA (US); John Honchariw, San Francisco, CA (US); Libby Rockaway, San Francisco, CA (US)

(73) Assignee: Companion Labs, Inc., San Francisco, CA (US)

( * ) Notice: Subject to any disclaimer, the term of this patent is extended or adjusted under 35 U.S.C. 154(b) by 0 days.

(21) Appl. No.: 18/817,037

(22) Filed: Aug. 27, 2024

(65) Prior Publication Data

US 2025/0081937 A1 Mar. 13, 2025

Related U.S. Application Data

(60) Provisional application No. 63/538,225, filed on Sep. 13, 2023.

(51) Int. Cl.
*A01K 15/02* (2006.01)

(52) U.S. Cl.
CPC .................. *A01K 15/022* (2013.01)

(58) Field of Classification Search
CPC . A01K 15/022; A01K 15/021; A01K 15/0201
See application file for complete search history.

(56) References Cited

U.S. PATENT DOCUMENTS

| 5,351,653 | A | * | 10/1994 | Marischen | ........... | A01K 15/021 |
| | | | | | | 119/905 |
| 6,651,592 | B2 | * | 11/2003 | Maddox | ............... | A01K 15/021 |
| | | | | | | 119/908 |
| 12,268,187 | B2 | * | 4/2025 | Lau Caruso | ......... | A01K 29/005 |
| 2021/0153456 | A1 | * | 5/2021 | Mundell | ............... | A01K 15/021 |
| 2023/0363352 | A1 | * | 11/2023 | Yin | .......... | A01K 5/02 |
| 2023/0389519 | A1 | * | 12/2023 | Mundell | ............... | A01K 5/0114 |

FOREIGN PATENT DOCUMENTS

| DE | 202023002261 U1 * | 2/2024 | ............ A01K 5/0275 |
| GB | 2590058 A * | 6/2021 | ............ A01K 15/021 |
| WO | WO-2023152696 A1 * | 8/2023 | ............ A61M 21/02 |

\* cited by examiner

*Primary Examiner* — Kristen C Hayes
(74) *Attorney, Agent, or Firm* — Run8 Patent Group, LLC; Peter Miller; Leah Raddatz

(57) ABSTRACT

One variation of a method includes: accessing an audio feed captured by an audio sensor integrated within a training apparatus deployed in an environment and configured to dispense units of a treat into a working field in the environment; detecting a bark event at a first time based on audible signals extracted from the audio feed; in response to detecting the bark event, based on environmental signals extracted from the audio feed, interpreting a set of environmental data representing conditions of the environment at the first time; selecting an intervention action, in a set of intervention actions, configured to mitigate the bark event; triggering the training apparatus to dispense units of the treat according to the intervention action; predicting an environmental trigger for the dog based on the bark event and the set of environmental data; and storing the environmental trigger in a dog profile generated for the dog.

1 Claim, 2 Drawing Sheets

SYSTEM AND METHOD FOR DETECTING AND REDUCING ANIMAL VOCALIZATIONS

CROSS-REFERENCE TO RELATED APPLICATIONS

This Application claims the benefit of U.S. Provisional Application No. 63/538,225, filed on 13 Sep. 2023, which is incorporated in its entirety by this reference.

TECHNICAL FIELD

This invention relates generally to the field of animal training and more specifically to a new and useful method for reducing animal vocalizations in the field of animal training.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
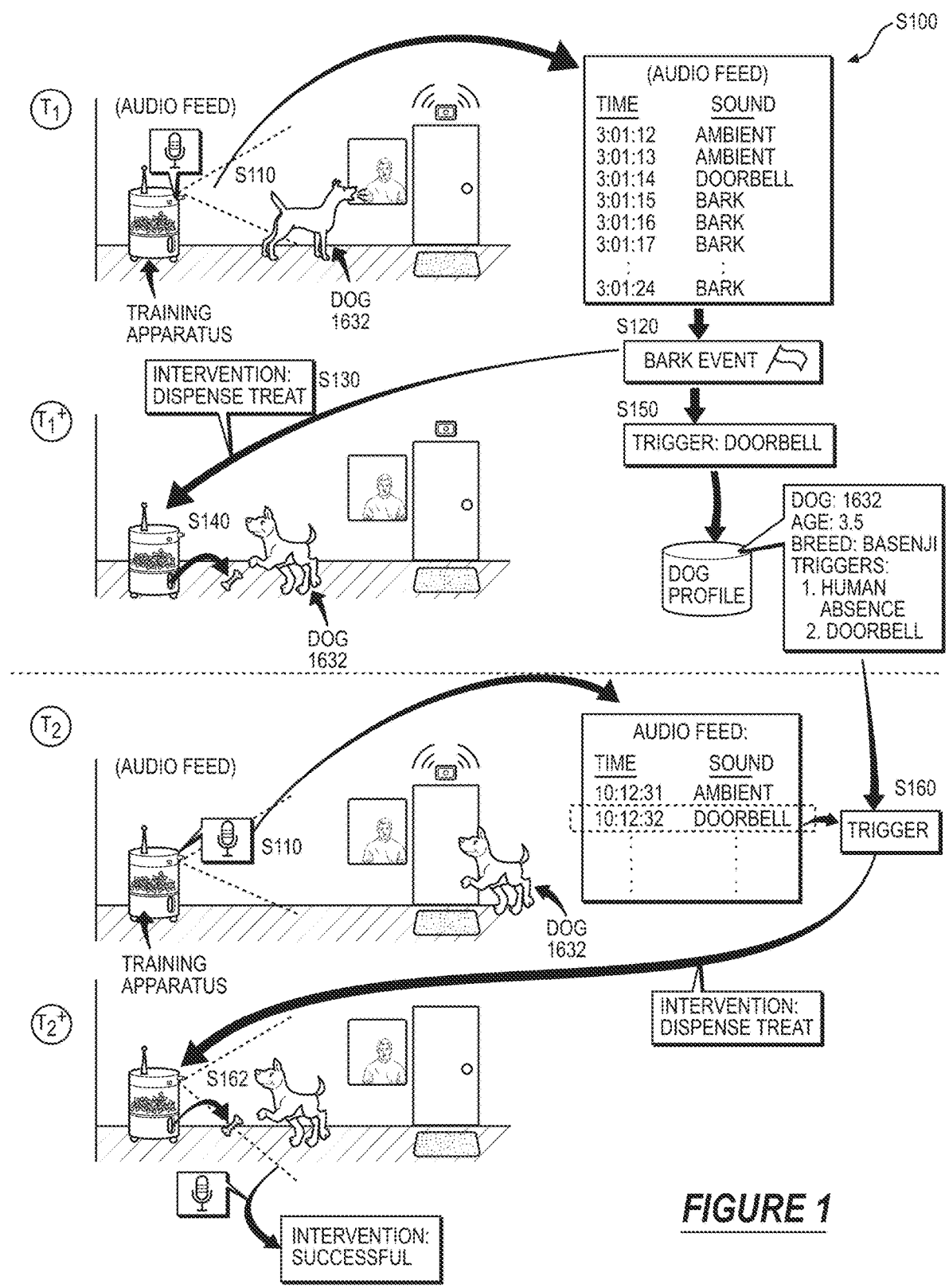
FIG. 1 is a flowchart representation of a method.

As shown in FIG. 1, a method S100 for training a dog to reduce barking includes: during a first time period, accessing an audio feed captured by an audio sensor integrated within a training apparatus deployed in an environment and configured to dispense units of a treat into a working field, within the environment, proximal the training apparatus in Block S110; and, at a first time, during the first time period, detecting a first bark event—corresponding to barking of the dog—based on audible signals extracted from the audio feed in Block S120. The method S100 further includes, during the first time period, in response to detecting the first bark event: interpreting a set of environmental data—representing conditions of the environment at the first time—based on environmental signals extracted from the audio feed; selecting an intervention action, in a set of intervention actions, configured to mitigate the first bark event in Block S130; triggering the training apparatus to dispense units of the treat according to the intervention action in Block S140; predicting a first environmental trigger, for the dog based on the first bark event and the set of environmental data in Block S150; and storing the first environmental trigger, in a set of environmental triggers, in a dog profile generated for the dog.

The method S100 further includes, during a second time period succeeding the first time period: accessing the audio feed captured by the audio sensor integrated within the training apparatus in Block S110; at a second time, during the second time period, interpreting a second set of environmental data—representing conditions of the environment during the second time period—based on environmental signals extracted from the audio feed; in response to the second set of environmental data corresponding to presence of the first environmental trigger in the environment, predicting a second bark event at a third time succeeding the second time in Block S160; in response to predicting the second bark event at the third time, triggering the training apparatus to dispense units of the treat according to the intervention action at a fourth time preceding the third time in Block S162.

2. Applications

Generally, Blocks of the method S100 can be executed by a computer system in conjunction with a training apparatus (hereinafter the "system") to automatically and responsively limit and/or reduce severity of barking episodes exhibited by a particular dog. In particular, the training apparatus can include: a microphone or other audio sensor configured to capture an audio feed of dog vocalizations (e.g., barking, whining) and external environmental noises (e.g., a human voice, a door closing, a doorbell ringing, a radio); a color camera or other optical sensor configured to capture an image feed of static images and/or video of the dog and an environment occupied by the training apparatus; a speaker configured to output audible cues configured to signal dispensation of treats into the working environment and/or output audible noises corresponding to various environmental stimuli (e.g., a doorbell, a ringtone, human footsteps); a reservoir configured to store treats (or kibble, dog toys, or other reinforcer); a dispensing subsystem configured to eject individual treat units into a working field nearby; and a loader configured to load treat units from the reservoir into the dispensing subsystem for releasing treats into the working field for consumption by the dog.

In one implementation, an owner of the dog may locate the training apparatus within her home and activate the system, such as by interfacing with the system directly or through a native application (e.g., a dog training native application) executing on her computing device (e.g., smartphone, tablet). Once active, the system can access live audio and/or video feeds captured by the training apparatus and selectively execute intervention actions responsive to detection of the dog barking in these audio and/or video feeds. In particular, the system can: detect an instance of the dog barking (or a "bark event") based on audible signals extracted from the audio feed and linked to barking for this particular dog; select an intervention action, from a set of intervention actions, predicted to mitigate the bark event, such as by reducing a duration of the bark event and/or terminating the bark event; and implement the intervention action in (near) real-time in order to rapidly respond to and/or mitigate this bark event. For example, in response to detecting initiation of a bark event, the system can immediately trigger the training apparatus to: output an audible cue configured to call the dog toward the training apparatus; and—in response to detecting the dog in a video feed captured by the optical sensor integrated in the training apparatus—immediately dispense a set of treats toward the dog. The system can therefore distract the dog from environmental stimuli associated with the bark event and further reward the dog for not barking and instead engaging with the training apparatus.

Furthermore, the system can: collect environmental data within the environment—such as representing a time of day, a day of the week, a location of the dog and/or training apparatus within the environment, a type(s) of inanimate object present, one or more sources of external noise (e.g., human voices, a television, a radio, a doorbell, a microwave, human footsteps, a lawnmower) detected in the environment, human and/or animal occupancy levels, etc.—and leverage this data to derive insights into types of environmental stimuli (or "triggers") associated with bark events for this particular dog. For example, over time, the system can identify a set of triggers for a dog, such as including: ringing of a doorbell installed on the owner's home; animal vocalizations external the home (e.g., output by a different animal); presence of a mail carrier proximal the home; a particular region (e.g., a room, an entryway, a floor) within the home; absence of human interaction with the dog for a threshold duration; etc.

The system can then preemptively implement intervention actions-such as prior to detection of a bark event—responsive to detection of these environmental triggers in the environment occupied by the dog. For example, in response to identifying a first environmental trigger for the dog corresponding to the doorbell tone, the system can automatically initiate an intervention action—including dispensation of treats at a fixed or dynamic frequency—responsive to detection of a human approaching the front door, such as based on a video feed captured by an optical sensor installed in the doorbell and/or based on detection of audible human footsteps in an audio feed captured by an audio sensor. The system can therefore prevent a predicted bark event by preemptively executing an intervention action based on environmental signals associated with a previously-identified environmental trigger for this dog.

Additionally, over time, the system can promote desensitization of the dog to various environmental triggers and thus reduce severity of bark events and/or minimize a number of bark events associated with these environmental triggers. For example, the system can: identify an environmental trigger associated with a tone emitted by the doorbell; and then selectively emit this tone—and/or a similar tone—concurrent dispensation of treats in order to increase exposure of the dog to this tone and promote an association between the tone and consumption of treats. Over time, the dog may therefore be less likely to exhibit negative behaviors—including barking or other types of vocalization (e.g., growling, whining, howling)—responsive to hearing this particular tone. By thus exposing the dog to the environmental trigger in a controlled environment and in combination with a positive reinforcer (e.g., treats, audible praise), the system can regulate the dog's response to this environmental trigger and—over time—train the dog to exhibit little to no (vocal) reaction responsive to the environmental trigger.

The method S100 is described herein as executed by the system to detect instances of barking (or "bark events") for a dog based on audio and/or video feeds captured of the dog. However, the method S100 can additionally or alternatively be executed by the system to detect instances of any type of animal vocalization, such as including barking, whining, whimpering, growling, etc.

3. Training Apparatus

Figure 2:
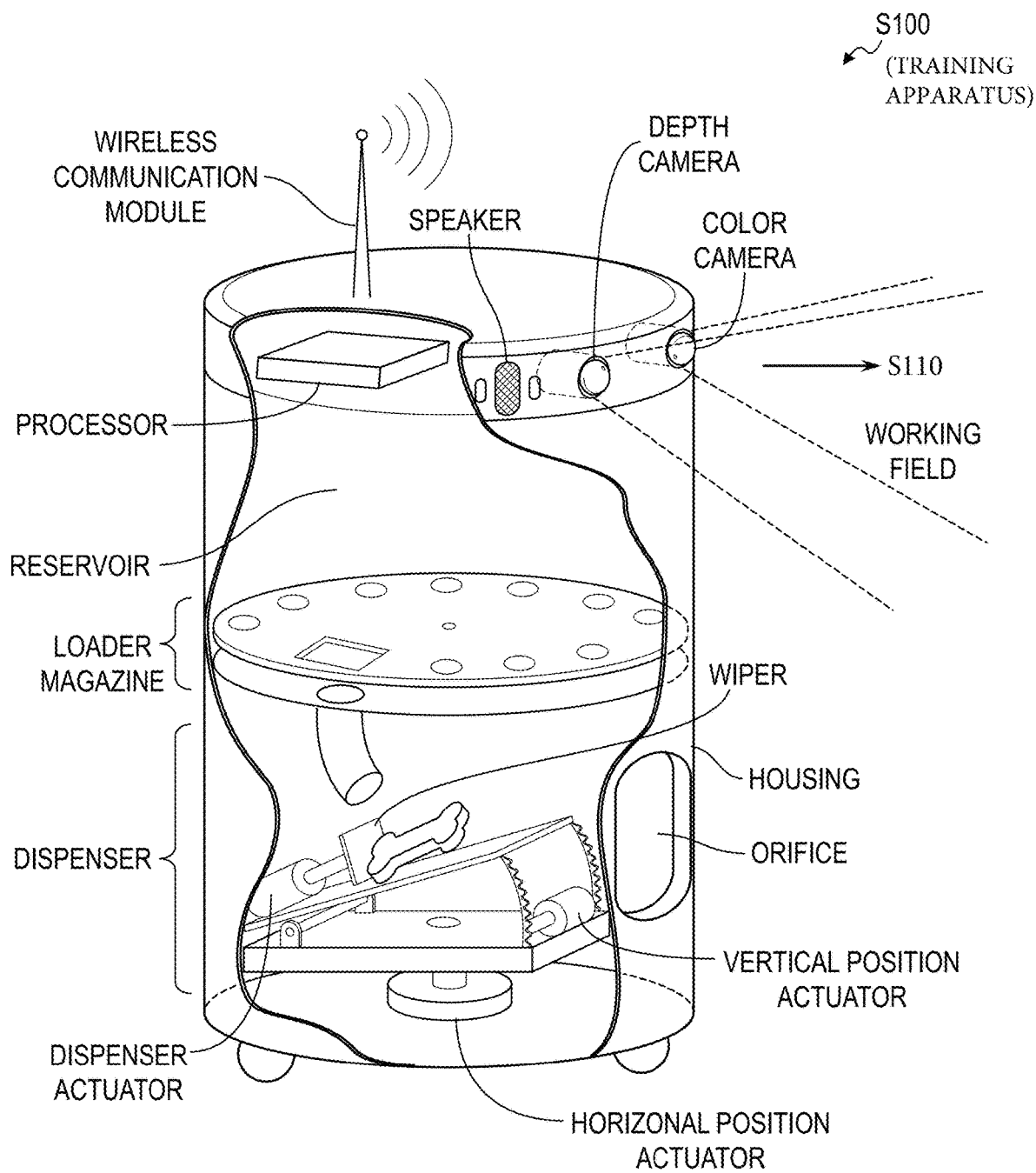
FIG. 2 is a schematic representation of a training apparatus.

As shown in FIG. 2, the training apparatus 100 can include: a suite of optical and/or audio sensors configured to record images (e.g., color and/or depth images) of a field ahead of the training apparatus 100 (hereinafter a "working field"); a speaker configured to output audible cues; a wireless communication module configured to download data and/or an animal model from a remote database or local computing device; a primary reinforcer reservoir configured to store units of a primary reinforcer, such as loose primary reinforcers or primary reinforcers in a magazine; a dispenser configured to eject primary reinforcers into the working field; a loader configured to load individual primary reinforcer units from the reservoir into the dispenser; a processor configured to interpret positions and poses of an animal in the working field in (near) real-time from images recorded by the suite of optical sensors, to confirm whether a position and/or pose of the animal matches a current command or training goal of a current training protocol, to move the dispenser into axial alignment with the animal as the animal moves through the working field, and to selectively trigger the dispenser to eject a primary reinforcer unit toward the animal accordingly; and a housing containing these elements.

3.1 Optical Sensors+Audio Sensors

In one implementation, the training apparatus 100 includes: a color camera configured to output 2D color images (hereinafter "color images"); and a depth camera configured to output 3D depth maps or point clouds (hereinafter "depth images"). In this implementation, the color and depth camera can be arranged in fixed positions on the housing and can define fields of view directed outwardly from the housing to define the working field in which the training apparatus 100 identifies, tracks, and selectively rewards an animal.

The training apparatus 100 can additionally or alternatively include an acoustic sensor (e.g., a microphone) configured to detect audible signals in the working field. For example, the training apparatus 100 can implement methods and techniques similar to those described herein to shape sound-related behaviors in an animal, such as responses to "speak" and "quiet" commands.

3.2 Speaker

As described above, the speaker is configured to output audible command cues in order to elicit a behavior or pose by an animal in the working field. The speaker can also output audible reinforcer cues (e.g., an audible tone) between detection of the animal performing the cued behavior or pose and ejection of a physical reinforcer (e.g., a "treat") to the animal by the training apparatus 100 in order to bridge a temporal gap between proper response to the audible command cue by the animal and the dispensation of the physical reinforcer to the animal. Over time, the animal may thus associate this audible reinforcer tone with positive reinforcement, which may later permit the training apparatus 100 to output the audible reinforcer tone rather than the physical reinforcer, such as if a primary reinforcer limit for the animal has been reached during a current session.

In one variation, the training apparatus 100 also includes a visual display—such as an LED array—configured to output visual cues to the animal. In this variation, the system can implement methods and techniques similar to those described below to output a visual queue corresponding to a particular command and target response and to selectively dispense reinforcement to an animal (e.g., in the form of a treat) when the training apparatus 100 detects that the animal has completed the target response.

3.3 Wireless Communication Module

The wireless communication module can include a wireless transceiver configured to connect to an external device and to retrieve various data from this device. For example, the training apparatus 100 can connect to a user's smartphone or tablet—executing a native dog training application—to access: animal characteristics or descriptors input by the user; oral commands spoken by the user and recorded by the user's device; and/or training protocol preferences or selections entered by the user at the device. The wireless communication module can also download a generic animal model from a remote database. Alternatively, the wireless communication module can download a particular animal model—from a set of available animal models—more tailored to detecting and identifying a particular animal designated for training by the training apparatus 100, such as based on a species, breed, age, size, or markings of the animal input by the user into the native dog application executing on her smartphone or tablet.

Furthermore, the wireless communication module can upload color and/or depth images recorded by the training apparatus 100 to a remote server in order to expand a training set of images of animals available to the remote server; the remote server can then retrain an animal model based on these additional data and redeploy the animal model to the training apparatus 100 (and to other instances of the training apparatus 100) to improve detection of an animal and identification of poses of the animal.

3.4 Reservoir, Loader, & Dispenser

The primary reinforcer reservoir is configured to store many units of a primary reinforcer. For example, the reservoir can include a container configured to store loose units of the primary reinforcer, a removable locking lid, and an outlet port that releases individual units into the loader. The loader is configured to sequentially move individual units out of the reservoir and into the dispenser. In one implementation, the loader includes an auger extending into the output port of the reservoir, terminating over the dispenser, and powered by a loader actuator that rotates the auger to transfer individual units from the reservoir into the dispenser.

In another implementation, the loader includes a magazine arranged inside the reservoir, configured to rotate inside the reservoir when powered by a loader actuator, and defining one or more slots configured to sequentially align with the outlet port in the reservoir. In this implementation, each slot can be sized to accept one unit of the primary reinforcer, and the reservoir can include a guard arranged inside the reservoir over the outlet port and offset from the outlet port by a distance sufficient for the magazine to pass between the guard and the outlet port. To dispense a unit, the loader actuator (e.g., a rotary electric motor) can index the magazine forward by an angular distance between adjacent slots in the magazine, thereby aligning a next slot—currently loaded with a single unit of the primary reinforcer—with the outlet port in the reservoir, which releases this unit from this slot toward the dispenser while the guard prevents additional units of the primary reinforcer from flowing down into this slot and through the outlet port in the reservoir.

(The loader can also include an optical detector or other sensor arranged across the outlet port in the retainer plate and configured to output a signal indicating that a unit has passed through the outlet port and into the dispenser below.)

The dispenser is configured to eject a unit of a primary reinforcer into the field, such as to a target lateral and depth position in the working field to land at an animal's feet or along a target trajectory to land at or near the animal's mouth.

In one implementation, the dispenser includes: a chamber arranged below the outlet of the loader (e.g., at the output end of the auger-type loader or below the outlet port of the reservoir) and configured to receive individual units of a primary reinforcer from the loader; an orifice or barrel extending from the chamber and facing the working field; a wiper (or a pin) configured to advance and retract behind the chamber; and a dispenser actuator configured to rapidly advance the wiper (or the pin) forward toward the chamber to drive individual units through the orifice and into the working field. For example, the actuator can include a solenoid configured to drive the wiper (or the pin) forward when triggered by the processor. In another example, the wiper (or the pin) is spring loaded; and the dispenser includes a linear or rotary actuator configured to retract the wiper (or pin) and a second actuator configured to release the wiper (or the pin) to drive the wiper forward and thus project an individual unit from the dispenser.

The dispenser (and loader and/or reservoir) can also be mounted on a gimbal configured to pivot (approximately) in the horizontal plane; and the training apparatus 100 can include a horizontal position actuator (e.g., a rotary electric motor) configured to rotate the gimbal in order to sweep the orifice of the dispenser through a range of angular positions—in the horizontal plane—across the working plane, such as to maintain the axis of the dispenser in alignment with an animal detected in the working field. The dispenser can also include an angular position sensor (e.g., an optical encoder, a potentiometer) configured to output an angular position of the gimbal relative to the housing.

However, the training apparatus 100 can include any other mechanisms configured to rapidly eject individual units into the working field when triggered by the processor and configured to sweep an axis of the dispenser horizontally across the working field.

3.5 Variation: Sensor Network

Additionally or alternatively, in one variation, the system can interface with a suite of external sensors—external the training apparatus—configured to capture environmental data of an environment occupied by the dog and/or the training apparatus. For example, the system can interface with a suite of sensors—deployed throughout an environment occupied by the dog—including: a set of audio sensors (e.g., microphones) configured to capture audio feeds of various audible sounds or noises (e.g., dog barking, human voices, doorbell ringing, doors opening, footsteps) emitted in regions of the environment occupied by the suite of sensors, such as remote from the training apparatus and/or integrated into the training apparatus; a set of image or video sensors configured to capture image feeds of various regions within the environment, such as installed on a doorbell exterior a home of the dog's owner, installed on a door to a garage of the home, and/or installed in various regions inside the home; an accelerometer integrated into a collar worn by the dog and configured to capture motion data for the dog; etc.

4. Onboarding: Native Application and Initialization

The system can interface with a native application or web application—executing on a user's computing device—to initiate an acclimation session with a dog and/or to later configure a series of training protocols for the dog. For example, once the system is received by the user, the user can download the native application to her smartphone and connect her smartphone to the system, such as by: wirelessly pairing her smartphone to the system; scanning a QR code arranged on the system to register the system to her smartphone; or by manually entering into the native application a unique code arranged on the system or product packaging.

Once the system is registered and connected to the user's smartphone, the user can create a new profile for her dog within the native application and manually populate the new profile with various information, such as: a name; age; breed; size; and/or primary colors of the dog's coat (e.g., black for a black Labrador or reddish-brown for a redbone coonhound). This new profile can be stored in a remote database, and the native application can upload these data to the new profile via the Internet. Alternatively, the system can extract or derive these dog characteristics directly from a video feed recorded during a first priming session or manual acclimation session with the dog and then populate the profile for the dog with these characteristics accordingly.

4.1 Bark Detection Model

Generally, once deployed and activated within an environment, the system can detect instances of the animal barking (or "bark events") based on data extracted from the audio and/or video feeds captured by the training apparatus.

In one variation, prior to initiating a training session with the dog and/or initiating bark detection for the dog, the system can: query a remote database for a bark detection model trained on audio recordings of dogs exhibiting similar characteristics (e.g., breed, age, size) of the dog; and then download this bark detection model from the remote database, such as over the internet or via the user's smartphone or tablet.

Similarly, the native application, the system, and/or the remote computer system can: tune a generic bark detection model based on various characteristics of the dog (e.g., stored in the dog profile); or select one bark detection model—from a corpus of existing bark detection models—developed to detect barks of dogs exhibiting various characteristics similar to those of the dog in audio feeds. The system can then implement a local copy of this animal model to rapidly detect barking of the dog in audio feeds recorded by the system during and/or outside of a training session with the dog.

By accessing a bark detection model "tuned" to detecting barks of dogs exhibiting characteristics similar to those aggregated into the dog's profile during setup, the system may detect the dog barking—such as proximal the training apparatus and/or within a particular environment occupied by the training apparatus—more quickly (e.g., in real time) and with increased confidence.

Alternatively, the system can implement a generic bark detection model to detect the dog barking, such as if limited information about the dog is provided by the user during setup. Additionally or alternatively, in this implementation, the system can calibrate the bark detection model over time based on identified instances of barking for this particular dog. In particular, the system can leverage audible signals—extracted from audio feeds of the dog and corresponding to barking for this particular dog—to further train the bark detection model to detect instances of this dog barking, such as based on unique characteristics (e.g., pitch, cadence, volume, sound) of this dog's bark.

Additionally or alternatively, in one variation, the system can access a bark detection model trained on images of dogs barking, such as including static images and/or frames extracted from video feeds depicting dogs barking. In this variation, the native application, the system, and/or the remote computer system can similarly: tune a generic bark detection model based on various characteristics of the dog (e.g., stored in the dog profile); or select one bark detection model—from a corpus of existing bark detection models—developed to detect barks of dogs exhibiting various characteristics similar to those of the dog in image feeds (e.g., a video feed, a static image feed). Additionally or alternatively, in yet another variation, the system can access a bark detection model trained on accelerometer data—representing vibrations of the dog's vocal cords—captured by an accelerometer integrated into a wearable device (e.g., a collar) worn by a dog. In particular, in this variation, the system can access a bark detection model configured to detect presence, absence, and/or a magnitude of barking based on accelerometer data captured for the dog.

The system can therefore leverage these bark detection models to detect and/or predict instances of the dog barking (or "bark events") based on audio and/or image feeds captured in an environment occupied by the dog.

5. Bark Detection+Bark Events

Once the system has accessed the foregoing data, the system (or the native dog training application, etc.) can prompt the user to locate the training apparatus in a particular environment occupied and/or regularly accessed (e.g., at a target frequency) by the dog. The system can then interpret instances of bark events for the dog based on audio and/or video data captured by the set of sensors (e.g., audio and/or optical sensors) integrated within the training apparatus.

In particular, in one implementation, the system can: access an audio feed captured by an audio sensor installed in the training apparatus; extract a timeseries of audible signals from the audio feed, such as corresponding to sounds captured in the audio feed and exceeding a threshold volume or decibel level; access a bark detection model selected for this dog and/or stored in the dog profile; and, based on the timeseries of audible signals and the bark detection model, derive a timeseries of bark events—corresponding to instances of the dog barking—for this dog during a particular time period represented by the audio feed.

Additionally or alternatively, in another implementation, the system can leverage image and/or video data to detect bark events for this dog. In particular, the system can: access a video feed captured by an optical sensor installed in the training apparatus; extract a timeseries of visual signals—such as corresponding to position and/or motion of the dog's mouth, head, or body—from the video feed; and, based on the timeseries of visual signals and a bark detection model, derive a timeseries of bark events for this dog for a particular time period represented by the video feed.

In each of these implementations, the system can track instances of bark events for the dog over time and store this information in the dog profile. Furthermore, for each bark event detected for the dog, the system can derive a set of bark data based on characteristics of the bark event and similarly store this set of bark data in the dog profile. For example, for a first bark event, in a timeseries of bark events detected for the dog during a first time period, the system can generate a first set of bark data—representative of the first bark event—such as including: a first time value corresponding to a first time, during the first time period, at which the first bark occurred; a first duration between the first bark event and a preceding bark event; a second duration between the first bark event and a succeeding bark event; a total duration of the first bark event; an average frequency of barks during the first bark event; a maximum bark volume of barking during the first bark event; and/or a severity (or "intensity") of the first bark event, such as based on the total duration, the average frequency of barks, the maximum bark volume, etc. The system can then: link this set of bark data to the first bark event in the timeseries of bark events; repeat this process for each bark event, in the timeseries of bark events, to generate a bark event packet representative of barking behavior of the dog during the first time period; and store the bark event packet, in a series of bark event packets, in the dog profile.

6. Interference: Real-Time Bark Detection

The system can leverage the audio feed captured at the training apparatus to detect instances of bark events in (near) real time and selectively implement intervention actions configured to mitigate bark events and/or limit a duration of bark events, such as by distracting the dog from a particular environmental trigger.

In one implementation, the system can: access an audio feed captured by an audio sensor (e.g., a microphone) integrated into the training apparatus (e.g., in real time); detect an instance of a bark event based on audible signals extracted from the audio feed (e.g., as described above); and execute an intervention action configured to mitigate the instance of the bark event.

For example, in response to detecting a bark event at a first time, the system can: output an audible cue configured to call the dog to the training apparatus, such as a voice recording previously-recorded by the dog's owner and/or a default audible tone signaling dispensation of a treat at the training apparatus; dispense a treat from the training apparatus to distract the dog; initiate a training session with the dog; and/or transmit a notification to the owner of the dog to engage with her dog.

Therefore, in response to detecting a bark event, the system can rapidly implement an intervention action configured to engage the dog and thus distract the dog from one or more stimuli associated with the bark event. Furthermore, the system can reward the dog for sustained periods of no barking following initial detection of the bark event, thereby encouraging the dog to limit and/or reduce barking in the future.

For example, in response to detecting the dog barking at a first frequency at approximately a first time, the system can: predict an instance of a bark event at the first time; select an intervention action—corresponding to a training protocol configured to promote periods of silence (or "no barking") for the dog—for implementation with the dog; load the training protocol onto the training apparatus; and immediately initiate the training protocol, such as by outputting an audible cue configured to call the dog to the training apparatus and dispensing a first set of treats toward the dog. The training apparatus can then continue to dispense treats at a particular frequency in order to limit barking.

7. Environmental Triggers: Timeseries Bark Data+Environmental Data

In one implementation, the system can capture environmental data—corresponding to characteristics and/or status of an environment occupied by the dog and/or the training apparatus—in combination with bark data captured for the dog to identify a set of environmental triggers (or "triggers") associated with bark events for this particular dog.

In particular, in this implementation, the system can: access audio and/or video feeds captured within an environment occupied by the animal; and, based on audible and/or visual signals detected in these feeds, interpret and track timeseries environmental data—such as representing a time of day, a day of the week, a location of the dog and/or training apparatus, type(s) of inanimate objects present in the environment, one or more sources of noise (e.g., human voices, a television, a radio, a doorbell, a microwave, human footsteps, a lawnmower) detected in the environment, human and/or animal occupancy, etc.—for the environment over time.

The system can then link this timeseries environmental data to timeseries bark data collected for the dog during a concurrent time period, and thus derive insights into environmental factors associated with barking or bark events for this particular dog. In particular, the system can: access a timeseries of bark data captured for the dog during an initial time period; delineate a timeseries of bark events within the initial time period based on the timeseries of bark data; access a timeseries of environmental data captured by the training apparatus during the initial time period; map the timeseries of bark events to the timeseries of environmental data; and thus derive a set of environmental triggers—such as a particular time of day, presence of a particular human, a particular location, ringing of a doorbell, human footsteps outside of a home occupied by the dog, etc.—linked to bark events for this dog.

The system can therefore identify a set of environmental triggers for this particular dog based on historical bark data collected for the dog and historical environmental data captured concurrently by the training apparatus (and/or other external sensors accessed by the system).

7.1 Trigger Desensitization

In one implementation, the system can execute a training session with the dog according to a training protocol configured to desensitize the dog to one or more environmental triggers associated with bark events for this particular dog. In particular, over time, the system can reduce sensitivity of the dog to various environmental triggers—such as including loud noises, a garage or door opening, human voices, animal vocalizations, etc.—in order to prevent and/or limit severity of future bark events associated with these environmental triggers.

In this implementation, the system can: implement methods and techniques described above to identify a set of environmental triggers associated with bark events for this dog; and, for each environmental trigger, in the set of environmental triggers, execute one or more training sessions with the dog—according to a particular training protocol selected for the environmental trigger—configured to minimize barking and/or reduce severity of bark events for this dog responsive to the environmental trigger. For example, during these training sessions, the training apparatus can output various environmental noises (e.g., humans speaking, music, a doorbell, footsteps, a dog barking) corresponding to environmental triggers for the dog in order to desensitize the dog to these environmental noises over time. In another example, the system can: generate a prompt to locate the training apparatus in a particular room in a house associated with bark events for the dog; and transmit the prompt to the user, such that the training apparatus can dispense treats to the dog in this particular room and thus desensitize the dog to this room.

In one example, in response to identifying a doorbell sound as an environmental trigger for the dog, the system can: access a library of audio recordings corresponding to environmental triggers for dogs; retrieve a doorbell recording, from the library of audio recordings, corresponding to a common doorbell tone; load the doorbell recording onto the training apparatus in preparation for a training session with the dog; and, during the training session, concurrently output the doorbell recording and dispense units of a treat to the dog in order to promote association (e.g., by the dog) between the treat and the doorbell tone. Over time, the system can therefore promote desensitization of the dog to the doorbell tone.

Additionally or alternatively, in the preceding example, the system can prompt the owner—associated with the dog—to confirm and/or reject the selected doorbell recording, in order to identify a particular doorbell recording best matched to the owner's doorbell tone. In particular, in this example, the system can: generate a notification including the doorbell recording and a prompt to review the doorbell recording; and transmit the notification to the owner (e.g., via the native application, via mobile phone). Then, in response to receiving confirmation of the doorbell recording, the system can upload the doorbell recording to the training apparatus. However, in response to receiving rejection of the doorbell recording, the system can: select a substitute doorbell recording in replacement of the doorbell recording; and similarly prompt the owner to review this substitute doorbell recording. Alternatively, the system can present the owner with a set of doorbell recordings (e.g., one or more doorbell recordings) and prompt the user to select a particular doorbell recording—best matched to the owner's doorbell tone—from the set of doorbell recordings.

Additionally or alternatively, the system can: automatically record a doorbell recording—of the owner's doorbell tone—extracted from an audio feed captured by an audio sensor installed on the training apparatus; store this doorbell recording in the dog profile generated for the dog; and leverage playback of the doorbell recording during training sessions with the dog in order to desensitize the dog to the doorbell tone.

7.2 Prevention: Predicted Bark Event

In one implementation, the system can preemptively implement an intervention action in order to prevent and/or mitigate a predicted bark event. In particular, in this implementation, the system can: predict an instance of a bark event at a future time, such as based on historical bark data collected for the dog; select an intervention action, in a set of intervention actions, predicted to prevent and limit a severity of the future instance of the bark event; and implement the intervention action at and/or prior to the future time at which the instance of the bark event is predicted to occur.

Generally, in this implementation, the system can leverage environmental signals—such as a time of day, a day of the week, a human occupancy level, a noise level, one or more sources of noise (e.g., a doorbell, a radio, a human, an animal, footsteps), a location of the dog, etc.—extracted from environmental data collected for the environment to predict future instances of bark events for the dog based on known environmental triggers identified for this dog.

In particular, in this implementation, the system can access audio and/or video feeds captured in an environment occupied by the training apparatus and/or by the animal during a first time period. Then, during a first sampling period within the first time period, the system can: extract a set of audio and/or visual signals—corresponding to the dog and/or external environmental factors—from the audio and/or video feeds; derive a set of environmental data—such as representing types of sounds (e.g., human voices, footsteps, vocalizations of other animals, a doorbell, a door closing or opening, music) detected in the audio feed, presence of one or more humans and/or other animals in the environment, inanimate objects present in the environment, a time of day, etc.—for the environment during the first sampling period based on the set of audio and/or visual signals; retrieve a set of environmental triggers identified for the dog and stored in the dog profile; and, for each environmental trigger, in the set of environmental triggers, characterize a correlation between the set of environmental data and the environmental trigger. Then, for a particular environmental trigger, in the set of environmental triggers, in response to the correlation exceeding a threshold correlation, the system can: detect an instance of the environmental trigger during the first sampling period and therefore predict an instance of a bark event (e.g., within a time period immediately preceding the first sampling period); select an intervention action associated with the environmental trigger and configured to prevent and/or mitigate the instance of the bark event; and execute the intervention action (e.g., via the training apparatus), such as prior to detection of a bark event.

7.2.1 Prevention: Time-Based

In one implementation, the system can preemptively schedule a set of intervention actions for the dog according to a set of time-based environmental triggers identified for the dog.

In particular, in this implementation, the system can: track a timeseries of bark data for the dog over an initial time period; detect instances of bark events at various times during the initial time period based on the timeseries of bark data; and, based on time values (e.g., a timestamp) corresponding to each detected bark event during the initial time period, flag a set of key time windows (e.g., reoccurring time windows) associated with bark events for the dog.

For example, the system can identify: a first key time window between 7 AM and 7:15 AM each weekday, such as corresponding to the dog's owner leaving the house for work; a second key time window between 12:45 PM and 1:15 PM each day of the week, such as corresponding to a mailman arriving at a front door of the house to deliver mail; a third key time window between 5:30 PM and 6 PM each weekday, such as corresponding to the dog's owner returning to the house from work; a fourth key time window between 6:30 PM and 6:45 PM each day, such as immediately preceding a meal time of the dog; etc. Then, based on these identified key time windows, the system can automatically schedule intervention actions for implementing with the dog at and/or immediately preceding these key time windows in order to prevent and/or minimize a severity of a predicted bark event during these key time windows.

In particular, in the preceding example, the system can: automatically schedule a first intervention action at 6:55 AM each weekday and for a duration of fifteen minutes. The training apparatus can therefore execute the intervention action at 6:55 AM—in order to distract the dog from the owner leaving the house at 7:00 AM—and continue executing the intervention action until 7:10 AM.

8. Tracking Barking Over Time

In one implementation, the system can monitor changes in barking behaviors for the dog over time. In particular, in this implementation, the system can: access an audio feed captured by the training apparatus during a first time period; interpret a first timeseries of bark events based on audible signals extracted from the audio feed; and, based on the first timeseries of bark events, derive a first set of bark data—such as representing a quantity of bark events, a first average duration between bark events, a first average severity of bark events, etc.—for the dog over the first time period. The system can then store this first set of bark data—in combination with the first timeseries of bark events—in the dog profile generated for the dog. Then, during a second time period succeeding the first time period, the system can implement methods and techniques described above in order to mitigate barking and/or bark events detected for this dog.

The system can then: access an audio feed captured by the training apparatus during the second time period; interpret a second timeseries of bark events based on audible signals extracted from the audio feed; and, based on the second timeseries of bark events, derive a second set of bark data—such as representing a quantity of bark events, a first average duration between bark events, a first average severity of bark events, etc.—for the dog over the second time period. The system can then similarly store this second set of bark data—in combination with the second timeseries of bark events—in the dog profile generated for the dog. Furthermore, the system can: characterize a difference between the first set of bark data and the second set of bark data; and, based on the difference, selectively implement additional and/or modified training sessions and/or intervention actions configured to improve barking behavior—such as by reducing barking—and/or mitigate instances of bark events.

For example, the system can: estimate a first difference between the first quantity of bark events and the second quantity of bark events; estimate a second difference between the first average duration and the second average duration; and/or estimate a third difference between the first average severity and the second average severity. The system can then calculate a total difference between the first set of bark data and the second set of bark data based on the first, second, and/or third differences. Then, in response to the total difference exceeding a threshold difference—corresponding to at least a minimum reduction in quantity of bark events, average duration of bark events, and/or severity of bark events—the system can confirm a current set of training protocols and/or intervention actions employed by the system. Alternatively, in response to the total difference falling below the threshold difference, the system can select a replacement training protocol and/or a replacement intervention action(s) for implementation with this dog during a third time period succeeding the second time period.

The system can thus monitor changes in barking behaviors—represented by bark data—exhibited by the dog over time, and leverage these changes to selectively implement training protocols and/or intervention actions during a subsequent time period.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for training a dog to reduce barking, comprising:
   during a first time period:
      accessing an audio feed captured by an audio sensor integrated within a training apparatus deployed in an environment and configured to dispense units of a treat into a working field, within the environment, proximal the training apparatus;
      at a first time, detecting a first bark event based on audible signals extracted from the audio feed, the first bark event corresponding to barking of the dog; and
      in response to detecting the first bark event:
         interpreting a first set of environmental data based on environmental signals extracted from the audio feed, the first set of environmental data representing conditions of the environment at the first time;
         selecting an intervention action, in a set of intervention actions, configured to mitigate the first bark event;
         triggering the training apparatus to dispense units of the treat according to the intervention action;
         predicting a first environmental trigger, for the dog based on the first bark event and the first set of environmental data; and
         storing the first environmental trigger, in a set of environmental triggers, in a dog profile generated for the dog; and
   during a second time period succeeding the first time period:
      accessing the audio feed captured by the audio sensor integrated within the training apparatus;
      at a second time, interpreting a second set of environmental data based on environmental signals extracted from the audio feed, the second set of environmental data representing conditions of the environment during the second time period;
      in response to the second set of environmental data corresponding to presence of the first environmental trigger in the environment, predicting a second bark event at a third time succeeding the second time; and
      in response to predicting the second bark event at the third time, triggering the training apparatus to dispense units of the treat according to the intervention action at a fourth time preceding the third time.

* * * * *